(No Model.)  2 Sheets—Sheet 1.

G. W. BIRCHALL.
FEED MECHANISM FOR SEWING MACHINES.

No. 336,786.  Patented Feb. 23, 1886.

(No Model.) 2 Sheets—Sheet 2.

G. W. BIRCHALL.
FEED MECHANISM FOR SEWING MACHINES.

No. 336,786. Patented Feb. 23, 1886.

Witnesses:
Jas. E. Hutchinson.
Henry C. Hazard.

Inventor:
Geo. W. Birchall by
Prindle & Russell, his Attys.

# UNITED STATES PATENT OFFICE.

GEORGE W. BIRCHALL, OF TOLEDO, OHIO, ASSIGNOR TO THE UNION MANUFACTURING COMPANY, OF SAME PLACE.

FEED MECHANISM FOR SEWING-MACHINES.

SPECIFICATION forming part of Letters Patent No. 336,786, dated February 23, 1886.

Application filed September 30, 1884. Serial No. 144,360. (No model.)

*To all whom it may concern:*

Be it known that I, GEORGE W. BIRCHALL, of Toledo, in the county of Lucas, and in the State of Ohio, have invented certain new and useful Improvements in Feed Mechanisms for Sewing-Machines; and I do hereby declare that the following is a full, clear, and exact description thereof, reference being had to the accompanying drawings, in which—

Figure 1:
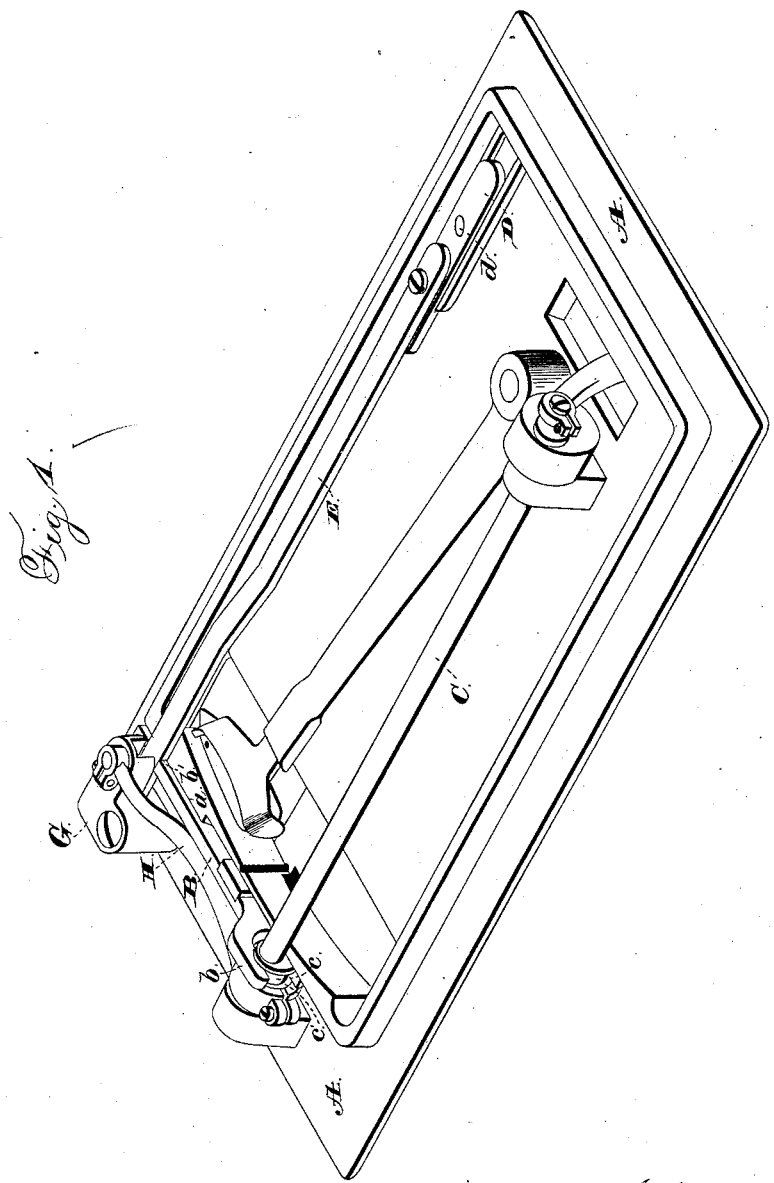
Figure 2:
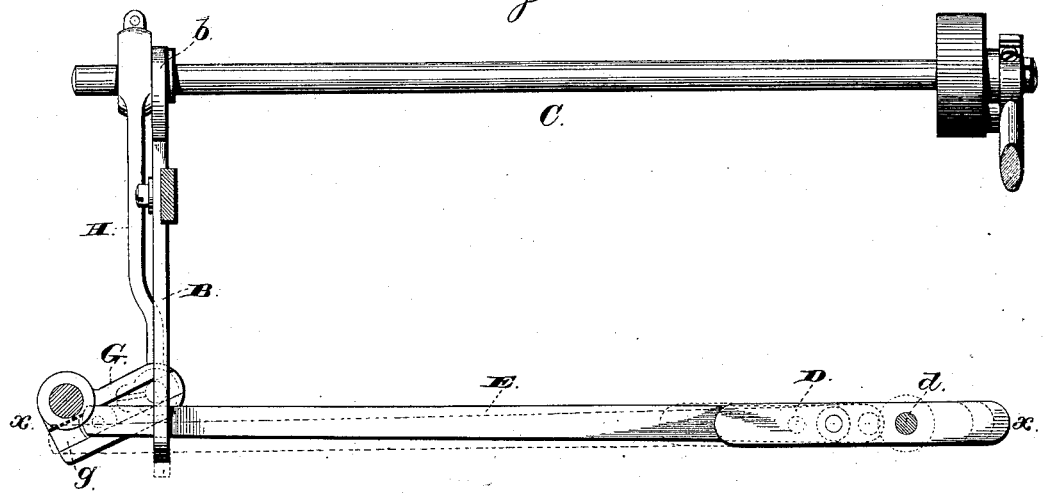
Figure 3:
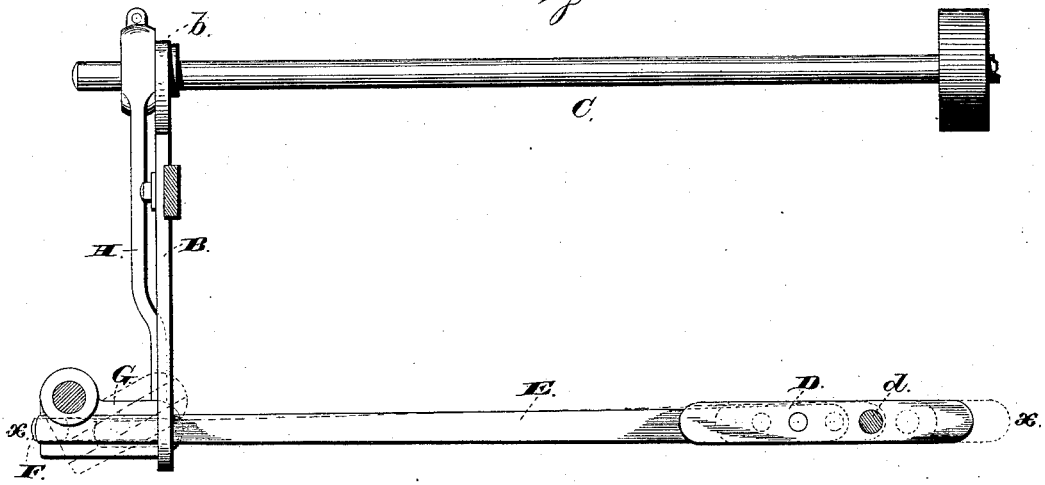
Figure 4:
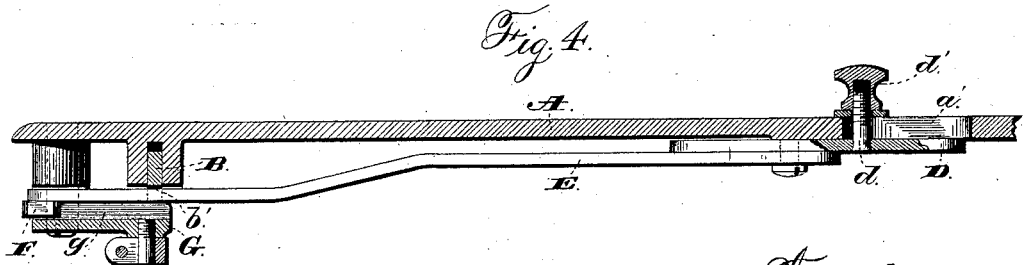

Figure 1 is a perspective view of the lower side of a sewing-machine containing my improvements. Figs. 2 and 3 are plan views of the upper side of the feed mechanism, the full and dotted lines showing the relative positions when the direct and reverse feeds are used; and Fig. 4 is a section upon lines $x\ x$ of Figs. 2 and 3.

Letters of like name and kind refer to like parts in each of the figures.

The design of my invention is to enable the feed of a sewing-machine to be easily and quickly reversed for the purpose of fastening the thread at the end of a seam, and to enable a seam to be double sewed, &c.

My invention consists in the construction, arrangement, and combination of parts, as hereinafter specified, and more specifically pointed out in the claims.

In the annexed drawings, A represents the base-plate of a sewing-machine within which, near its front end, is a feed-bar, B, that at its rear end, $b$, is forked, and embraces and is oscillated vertically by a cam, $c$, which is secured upon and rotates with a shaft, C, while at its front end said feed-bar fits loosely within a corresponding groove, $a$, that is formed within said base-plate, and by suitable means is held in vertical position therein while free to move longitudinally the required distance.

Near the front side and rear end of the base-plate A is a short bar, D, which is provided with a stud, $d$, that extends upward through a longitudinally-arranged slot, $a'$, in said plate, and upon its upper threaded end receives a thumb-nut, $d'$, which nut, when screwed downward, serves to confine said bar in position upon said base-plate. By loosening said nut said bar D may be moved longitudinally a distance slightly less than the length of said slot, for purposes hereinafter named.

Pivoted to or upon the bar D is one end of a bar, E, which latter from thence extends forward to a point beyond the feed-bar B and passes through a corresponding notch, $b'$, that is formed within the lower edge near the front end of said feed-bar. To the front end of said bar E is pivoted a block, F, which has vertical parallel sides, and fits into a correspondingly-shaped groove, $g$, that is formed within the upper side of an L-shaped rocker, G. Said rocker is pivoted to or upon the base-plate A at a point near the outer end of its short arm, so as to cause its long arm, with said groove $g$, to occupy a position substantially in a line with the front edge of said base-plate and at a right angle with said feed-bar.

The rocker G is caused to oscillate to equal distances from its normal position by means of an eccentric, $c'$, upon the shaft C, and a rod, H, which at one end is journaled upon said eccentric, and at its opposite end is pivoted upon the end of the long arm of said rocker, such motion being transmitted to the feed-bar B through the block F and bar E, so as to produce in said feed-bar the usual forward and back movement.

The amount of longitudinal motion of the feed-bar B, and consequently the length of stitch, is governed by the position of the block F with relation to the pivotal bearing of the rocker G, such motion being greatest when said block is farthest from said pivotal bearing, so that by loosening the thumb-nut $d'$ and moving the bars D and E in the necessary direction any desired length of stitch within the limit provided may be obtained.

The forward feed of the machine is produced by the portion of the rocker G between the pivotal bearing of the latter and the rear end of the base-plate, and if the block F is moved forward beyond said pivotal bearing the motion of the feed-bar B will be reversed, and the fabric being operated upon will be fed backward, so that by shifting the position of the bar E said fabric can be caused to travel backward or forward beneath the needle any desired number of times. This arrangement enables the thread to be securely fastened at the end of a seam or the double stitching of any part, and also the mending of holes in cloth by causing the part to travel back and forth beneath the needle in two or more directions until the thread has been caused to interlock and to produce at such point a fabric which will be a substantial substitute for the original and may have any desired thickness.

While any desired length of stitch upon the back-feed may be arranged for in constructing the machine, in practice it is found best to provide for but one length—that usually employed for ordinary work—and for such the front end of the slot $a'$, limiting the motion of the stud $d$ and thumb-nut $d'$ in such direction, furnishes a gage.

I do not claim as my invention the longitudinally-adjustable swinging bar connected with the feed-bar so as to actuate the same, and pivotally-connected with the swinging arm or rocker so that its pivotal connection therewith can be adjusted toward or from the pivotal center of the arm or rocker, but not beyond and on opposite sides of such center; nor do I claim, broadly, the means and mechanism shown and described for connecting the rocker or swinging arm with the feed-bar to actuate the latter, except such mechanism is so connected with the rocker or arm as to be capable of adjustment to drive the feed-bar in either direction, as well as to regulate its throw.

Having thus fully set forth the nature and merits of my invention, what I claim is—

1. In a sewing-machine-feed mechanism, in combination with the swinging bar pivoted to an adjustable block or slide engaging the feed-bar, and adapted to actuate the same directly as it swings, the horizontally-oscillating rocker, and a pivotal connection between the rocker and the swinging bar adapted to be caused to occupy different portions at or near either side of the center of oscillation of the rocker by the longitudinal movement of the swinging bar, substantially as and for the purpose described.

2. In a sewing-machine-feed mechanism, in combination with the feed-bar, and with a swinging longitudinally-adjustable bar connected therewith, a swinging arm or rocker having a groove extending on both sides of its pivotal center, and a pivotal connection between the bar and arm engaging the groove in the latter, substantially as and for the purpose described.

3. In a feed mechanism for sewing-machines, in combination with the feed-bar, the longitudinally-adjustable pivoted swinging bar arranged substantially at right angles to the feed-bar and engaging a portion of the same, the block pivoted on the swinging bar, the horizontally-oscillating rocker having a groove extending past and on both sides of its pivotal center, in which slides such block, and means for adjusting the bar so as to cause the pivoted block thereon to occupy any desired position on either side of the center of oscillation of the rocker, substantially as and for the purpose set forth.

4. In combination with the feed-bar B, the longitudinally-adjustable swinging bar E, pivoted at its rear end, and near its front end engaging a notch in the feed-bar, the block F, pivoted to the front of the swinging bar, the rocker G, provided with the groove $g$, extending past its pivotal center and receiving the block F, and means, substantially as described, for adjusting the bar E longitudinally, to vary the position of the block F on either side of the center of oscillation of the rocker, substantially as and for the purpose described.

In testimony that I claim the foregoing I have hereunto set my hand this 20th day of September, 1884.

GEO. W. BIRCHALL.

Witnesses:
H. G. NORTON,
W. O. DAKIN.